Nov. 11, 1969  K. E. LUGE ET AL  3,477,203
METHOD FOR COOLING THE COMBUSTION GASES
OF REFUSE INCINERATORS
Filed May 1, 1968
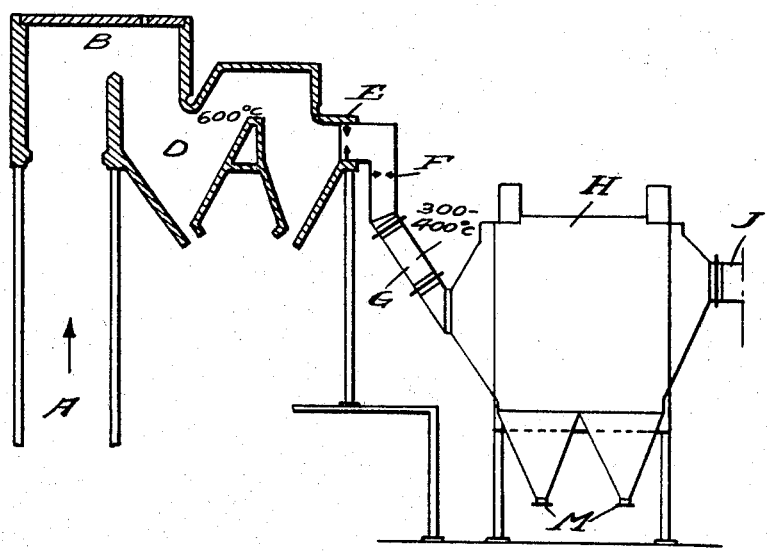
INVENTORS
KARLHEINZ LUGE,
WOLFGANG BRAUN,
BY Stephens, Huettig and
O'Connell
ATTORNEYS United States Patent Office 3,477,203
Patented Nov. 11, 1969

3,477,203
METHOD FOR COOLING THE COMBUSTION GASES OF REFUSE INCINERATORS
Karlheinz E. Luge, Mainz-Mombach, and Wolfgang Braun, Bad Homburg, Germany, assignors to Metallgesellschaft Aktiengesellschaft, Frankfurt am Main, Germany
Continuation-in-part of application Ser. No. 691,165, Dec. 20, 1967. This application May 1, 1968, Ser. No. 725,735
Claims priority, application Germany, Dec. 24, 1966, M 72,170
Int. Cl. B01d 47/02
U.S. Cl. 55—9                              7 Claims

ABSTRACT OF THE DISCLOSURE

A two step process for cooling the hot combustion gases of refuse incinerators prior to the cleaning of the gases in electrostatic dust collectors. In the first step, the hot gases are cooled to about 600° C. by injecting a cooling liquid directly into the gases in the furnaces of the plants, and in the second step the gases are further cooled to about 300 to 400° C. by infiltrating the gases with air.

CROSS-REFERENCE TO RELATED APPLICATION

This application is a continuation-in-part of copending application Ser. No. 691,165, filed Dec. 20, 1967, and now abandoned.

BACKGROUND OF THE INVENTION

*Field of the invention*

The invention relates to the cooling and cleaning of hot combustion gases.

*DESCRIPTION OF THE PRIOR ART*

The temperature of the combustion gases of refuse incinerators is above 900° C. In order to utilize the sensible heat of the combustion gases, either a waste heat boiler is arranged after the incinerator so that the combustion gases are cooled to such an extent, by passing them through the waste heat boiler, that they can be cleaned in a subsequently employed electrostatic dust collector without further treatment, or the gases are cooled by other means to a temperature of no higher than about 400° C. in order to avoid damage to the electrostatic dust collector. A relatively simple way of cooling the combustion gases is to mix the gases with infiltrated air. This procedure, however, leads to considerable disadvantages relative to the use of the subsequently employed electrostatic dust collector. The volume of gas to be cleaned may be very large depending on the volume of air which is necessary to cool the combustion gases from 900° C. to 300° to 400° C. In addition to this, the dew point of the gases to be cleaned is lowered by adding atmospheric air to the combustion gases, thereby impairing the efficiency of the electrostatic dust collector. When the combustion gases are cooled by air infiltration the electrostatic dust collectors have to be designed considerably larger than when the cooling is effected, for instance, by injecting water into the gases, because then, not only larger volumes of gas, but also the unfavorable condition of the gas-dust mixture have to be taken into account.

It is known that the electrostatic dust collectors operate under optimum conditions when the gases to be cleaned therein are first cooled from above 900° C. to, for example, 300–400° C. by means of known evaporation coolers. The capital expenditure involved in the use of such evaporation coolers, however, is very high. Such evaporation coolers are very expensive because they must be made relatively large and thus require the use of large amounts of construction materials in their manufacture. The relatively large size of the evaporation coolers is necessary in order to accommodate the need for holding the hot gases therein until the water content of the gases is completely vaporized. The complete vaporization of the water vapor is necessary in order to prevent the formation of sludge in the equipment since the removal of such sludge would add further expense to the process. In addition to this, the gas pipes and ducts which are used in such evaporation coolers have to be constructed of heat resisting material, which means that in most cases a refractory lining is necessary in such equipment.

SUMMARY OF THE INVENTION

The object of the present invention is to provide a process whereby the hot combustion gases of refuse incinerators may be readily cooled prior to their treatment in electrostatic dust separators, without unduly affecting the dew point of such gases or unduly increasing the volume of gases to be treated in the electrostatic dust separators.

The essence of the present invention is a two step process for cooling hot combustion gases of refuse incinerator plants by first partially cooling the gases to about 600° C. by spraying water into the gases in the furnace in such a way that the water is completely vaporized, and then by further cooling the gases outside the furnace to about 300–400° C. with air.

BRIEF DESCRIPTION OF THE DRAWING

The drawing shows a furnace installation for carrying out the process of the present invention.

DETAILED DESCRIPTION OF THE INVENTION INCLUDING PREFERRED EMBODIMENT

According to the novel process of the present invention the method for cooling the combustion gases from refuse incinerators from temperatures of above 900° C. to temperatures of about 300 to 400° C. consists of two steps. In the first step a cooling liquid is injected directly into the hot gases while they are still in the furnaces in the incinerator plants so as to thereby lower the temperature of the combustion gases to about 600° C., and in the second step the temperature of the gases is further reduced to about 300–400° C. by the infiltration of atmosphere air into the gases.

The cooling liquid, usually water, is injected into the furnace under such conditions that it becomes and remains completely vaporized in the furnace so as to prevent the formation of sludge in the furnace. The gases are cooled in the furnace in the first step of the process to about 600° C. since the time required for vaporizing the water which is injected into the furnace is relatively short at temperatures of about 900° to 600° C. The volume of the furnace has to be large enough, of course, so that at temperatures of 600 to 900° C. there is adequate time for the water to be completely vaporized in the furnace while the hot gases are still present therein. The duration time for the hot gases in the furnace, however, is not long enough in order to cool the gases directly to a temperature of 300° to 400° C., as is done in the vaporization cooler, where repeated evaporation steps are required for this purpose. For this reason, therefore, it is necessary to further cool the hot gases from about 600° C. to about 300 to 400° C. with cool air in a second cooling step.

This invention combines the advantages of the two described prior art processes and avoids the disadvantages of such processes, that is, on the one hand the extremely large amounts of hot gases that have to be processed in the electrostatic dust separators as well as the lowering of the water and $CO_2$ content of the gases, which is undesirable when treating the gases in the electrostatic dust separators, both of which problems arise when the hot gases are only cooled with air, and on the other hand the high capital expenses that have to be invested in special evaporation coolers.

The following example is merely illustrative of the present invention and is not intended as a limitation upon the scope thereof.

EXAMPLE

The process of the present invention may be further explained with reference to the refuse incinerator installation shown in the drawing which was designed for the use of such process therein. The installation shown is actually in use in the Tourcoing District of France. In this installation two refuse incinerators were employed which did not utilize the sensible heat of the combustion gases for any purpose. The projected amounts of combustion gas for each of the incinerators during the operation thereof was 27,100 normal cubic meters per hour at a gas temperature of about 1000° C.

The hot combustion gas from one of the incinerators A rises up to the top B of the furnace where 4800 liters per hour of cool water at a temperature of about 10 to 20° C. is sprayed into the gases so as to cool them from about 1000° C. to about 600° C.

The gases remain in areas B and D of the furnace long enough for the water to be completely vaporized therein, and the volume of areas B and D are designed large enough so as to permit this to occur. The combination of the combustion gases and the vaporized water provides a total gas volume flow of 33,070 normal cubic meters per hour through area D. As the hot gases leave the furnace at 600° C. about 31,200 normal cubic meters per hour of cool air having a temperature of about 10° to 30° C. is injected into the gases through ports E and F and the air is thoroughly mixed with the gases. The temperature of the gas when it reaches conduit G, which is just outside electrostatic dust precipitator H, is about 300–400° C. The total gas flow through conduit G is about 64,270 normal cubic meters per hour at an average temperature of 340° C. After having dust removed therefrom the clean gas is circulated out of precipitator H through conduit J and the dust which is removed from the gas, is then removed from precipitator H through hoppers M.

The amounts of water and air which are injected into the hot gas stream, depending on the desired final temperature thereof, are automatically adjusted by means of a control device, not shown, in accordance with fluctuations in the volume and temperature of the hot gases from the furnace. In the example given above the amounts of air and water that were injected into the hot gases were regulated so as to provide that the temperatures at G were 340° C.±30° C.

The hot gases leaving the furnace at about 1000° C. have an average dew point of about 50° C. and the ultimate dew point of the gases is then raised to about 55° C. by the addition of the water thereto in spite of the amounts of air that are also added. This final dew point provides for favorable operating conditions in the electrostatic filter, as evidenced by the fact that the installation has met its intended performance specifications with good results.

The cooling liquids which are used in the process of the present invention are usually injected into the hot gases in the furnace in the form of a fine spray and the process can be conducted continuously. When injected into the gases the cooling liquids are at a temperature of about 10 to 20° C. When water is used as the cooling liquid, about 1 liter of water having a temperature of 15° C. is needed to lower the temperature of about 565 liters at NTP of the hot combustion gases from about 1000° C. The cooling liquids which may be used include water and other liquids which are chemically inert with respect to the hot gases. Water is the preferred liquid because of its low cost and high heat of vaporization. The air which is used in the second step of the process of the present invention to cool the combustion gases to about 300 to 400° C. is taken from the atmosphere and used at atmospheric temperatures. About 1 normal liter of this air at about 20° C. and 50% relative humidity is needed for about 1 normal liter of the hot gases. The cool air is injected into the hot gases, as through ports E and F in the installation shown in the drawing, in order to provide a thorough distribution in, and admixture with, the hot gases.

It is to be noted that the invention can be used to treat any hot gases having a temperature of >600° C. and containing dust particles for the purposes of cooling the gases before the dust is to be cleaned from the gases.

We claim.
1. In a process for cooling, from about 900° C. to about 300° to 400° C. hot gas produced in a furnace and containing dust particles prior to the cleaning of said dust particles from said gas, the improvement comprising:
   first cooling said gas from about 900° C. to about 600° C. by injecting sufficient quantities thereof of a cooling liquid directly into said gas in said furnace under such conditions that said cooling liquid becomes and remains completely vaporized in said furnace,
   then further cooling said gas to about 300° to 400° C. by infiltrating the gas with sufficient quantities therefor of air at atmospheric temperature and thereafter passing said cooled gas to an electric precipitator.
2. A process as in claim 1 in which said furnace is in a refuse incinerator plant.
3. A process as in claim 1 in which said cooling liquid is water.
4. A process as in claim 3 in which said water is used at a temperature of about 10 to 20° C.
5. A process as in claim 1 in which said air is used at a temperature of about 20° C.
6. A process as in claim 1 in which the gas, when cooled to about 300° to 400° C. has a dew point of about 45° to 60° C. and a $CO_2$ content of about 2.5 to 5 volume percent.
7. A process as in claim 1 in which the cooling liquid remains completely vaporized during the air cooling step and during the cleaning of the dust therefrom.

References Cited

UNITED STATES PATENTS

| | | | |
|---|---|---|---|
| 2,940,733 | 6/1960 | Umbricht | 55—257 |
| 3,029,578 | 4/1962 | Weimer et al. | 55—257 |
| 3,382,649 | 5/1968 | Richmond | 55—84 |

FOREIGN PATENTS

| | | |
|---|---|---|
| 982,723 | 2/1965 | Great Britain. |

REUBEN FRIEDMAN, Primary Examiner
CHARLES N. HART, Assistant Examiner

U.S. Cl. X.R.
55—84